(12) United States Patent
McDaid et al.

(10) Patent No.: US 6,321,961 B1
(45) Date of Patent: Nov. 27, 2001

(54) BICYCLE RETENTION BRACKET

(75) Inventors: Cornelius McDaid, Dorchester; John D. Fiegener, Mendon; Peter Zane, Brookline, all of MA (US)

(73) Assignee: Kryptonite Corporation, Canton, MA (US)

(*) Notice: Subject to any disclaimer, the term of this patent is extended or adjusted under 35 U.S.C. 154(b) by 0 days.

(21) Appl. No.: 09/390,076

(22) Filed: Sep. 3, 1999

(51) Int. Cl.[7] .................................................. B62J 11/00
(52) U.S. Cl. ........................ 224/442; 70/233; 224/425; 224/443; 224/447; 224/451; 224/459; 224/935
(58) Field of Search ................... 224/443, 442, 224/425, 447, 451, 459, 935, 414; 70/49, 233; 248/229

(56) References Cited

U.S. PATENT DOCUMENTS

| | | | |
|---|---|---|---|
| 3,848,783 | * 11/1974 | Falk | 224/935 X |
| 3,967,475 | * 7/1976 | Zane | 224/935 X |
| 4,126,024 | 11/1978 | Timmons et al. | |
| 4,970,882 | 11/1990 | Arrendondo . | |
| 5,076,526 | 12/1991 | Zane et al. . | |
| 5,138,901 | 8/1992 | Dabandjian et al. . | |
| 5,291,765 | 3/1994 | Hoisington . | |
| 5,405,113 | * 4/1995 | Jaw | 248/229 |
| 5,647,520 | 7/1997 | McDaid . | |
| 5,669,536 | * 9/1997 | Wang | 224/443 |
| 5,704,525 | * 1/1998 | Barro | 224/414 |
| 5,704,526 | * 1/1998 | Kuo | 224/425 |
| 5,761,934 | * 6/1998 | Kuo | 70/49 |
| 5,810,228 | * 9/1998 | Brokering | 224/414 |
| 6,016,673 | * 1/2000 | McDaid | 70/49 X |

* cited by examiner

*Primary Examiner*—Stephen K. Cronin
*Assistant Examiner*—Maerena W. Brevard
(74) *Attorney, Agent, or Firm*—Testa, Hurwitz & Thibeault, LLP (57) ABSTRACT

A bicycle retention bracket system includes a bracket having an open loop end for attachment to a bicycle and a clasping end having a U-shaped seat surrounded by a living hinge clamping mechanism for releasably clasping an article, such as the locking mechanism of a bicycle lock. The article to be secured has at least one semi-circular trough for guiding and securing the lock in the U-shaped seat.

14 Claims, 7 Drawing Sheets

BICYCLE RETENTION BRACKET

BACKGROUND OF THE INVENTION

1. Field of the Invention

The present invention relates to mounting means for bicycle accessories and, more particularly, to an apparatus for releasably attaching locks and other accessories to a bicycle.

2. Description of the Related Art

Bicycle locks are generally of two distinct categories. The first category includes the solid U-shaped lock. This type of lock is typically made from forged steel and has a U-shaped portion that releasably engages a keyed locking cylinder. These locks work by wrapping the U-shaped portion around the bicycle frame and a bicycle rack, a stationary structure, and or one of the bicycle tires. The parallel ends of the U-shaped portion are then inserted into the locking cylinder. The locking cylinder typically employs a locking mechanism that engages notches in the parallel ends to secure the U-shaped portion in place.

A second type of bicycle lock is the cable lock. These locks are typically comprised of twisted strands of steel wire encapsulated in a plastic or rubberized cover. Cable locking devices are normally coiled for convenience of storage and generally will either have loops on the ends of the cable for receiving a padlock device; alternatively, one end can be incorporated into a combination or key lock for releasably receiving the other end of the cable. Cable locks work by uncoiling the lock and wrapping it around the bicycle frame and a tire, bike rack or other stationary object.

Various systems exist for stowing both types of bicycle locks when not in use. A bracket device, fixedly attached to the bicycle, is used to stow most U-shaped locks (see U.S. Pat. Nos. 5,076,526 and 5,138,901). Typically these bracket devices are bolted or otherwise affixed to the bicycle frame, handlebars or seat post and usually have an opening through which the locking cylinder portion of the U-shaped lock is inserted. A clamp or other means rigidly secures the locking cylinder in place. After the locking cylinder is secured in the bracket the U-shaped portion is inserted into the locking cylinder and locked in place. A disadvantage of these bracket systems is that the locks must be unlocked and separated before stowage and removal can occur. This forces the user to insert a key into the locking cylinder prior to removal from the bracket. Often it is difficult or inconvenient to unlock the cylinder while the cylinder remains in the bracket—for example, if the lock is facing downward, under poor lighting conditions, or if access to the lock is limited.

Cable locks traditionally have been stowed, when not in use, by coiling the cable portion of the lock about the seat post or other portion of the frame of a bicycle. One drawback to this stowage method is that it is time consuming to coil and uncoil the cable when stowing and removing the lock. As with U-shaped locks, this method of stowing cable locks requires that the lock be unlocked prior to stowage and use. This can pose problems beyond those mentioned above, especially if the cable lock is of the combination variety. For instance, it is difficult to shield the lock combination from others when removing the lock from the bicycle. In addition, depending upon the size of the combination lock mechanism, the user may need to maneuver closer to the lock to view the numbering sequence when removing the lock from the bicycle. Increasing the size of the numbers reduces this problem, yet intensifies the difficulty in shielding the combination from others.

More recently, various types of cable lock brackets have been utilized that are fixedly attached to a portion of the bicycle frame and that have self-coiling mechanisms (see U.S. Pat. Nos. 4,126,024 and 4,970,992). These cable lock bracket devices have housings that hold retractable lengths of cable. They reduce the problem of coiling the cable lock for stowage, but because their housings are fixedly attached to the bicycle frame, utilizing the lock portion of these devices for more than one bicycle at a time is impractical. In addition, as above, these lock brackets require that the lock be unlocked at the housing prior to use.

SUMMARY OF THE INVENTION

Accordingly, it is an object of the present invention to provide an improved bicycle lock and bracket system.

A further object of the present invention is to provide a lock bracket that is capable of releasably stowing both the U-shaped type locks and the cable type locks to a bicycle or other device.

Another object of the present invention is to provide a lock bracket that releasably stows a bicycle lock without requiring unlocking prior to releasing the lock.

Still a further object of the present invention is to provide a bracket mechanism that is capable of releasably securing accessories in addition to locks to a bicycle.

Other objects will, in part, be obvious and will, in part, appear hereinafter. The invention accordingly, comprises the features of construction, combination of elements and arrangements of parts which will be exemplified in the following detailed description and the scope of the invention will be indicated in the claims.

Briefly, our bicycle retention system includes a bracket that connects on one end to a bicycle and on another end has a U-shaped clamping mechanism for releasably holding locks and other bicycle accessories. The clamping mechanism employs a flexible hinge clamping assembly that flexes out of the way to accept an accessory and snaps back in place to confine the accessory. The retention system is capable of securing U-shaped locks, cable locks or other accessories to a bicycle.

BRIEF DESCRIPTION OF THE DRAWINGS

For a fuller understanding of the nature and objects of the invention, reference should be had to the following detailed description taken in connection with the accompanying drawings, in which.

The invention description below refers to the accompanying drawings, of which.

DETAILED DESCRIPTION OF AN ILLUSTRATIVE EMBODIMENT

Figure 1:
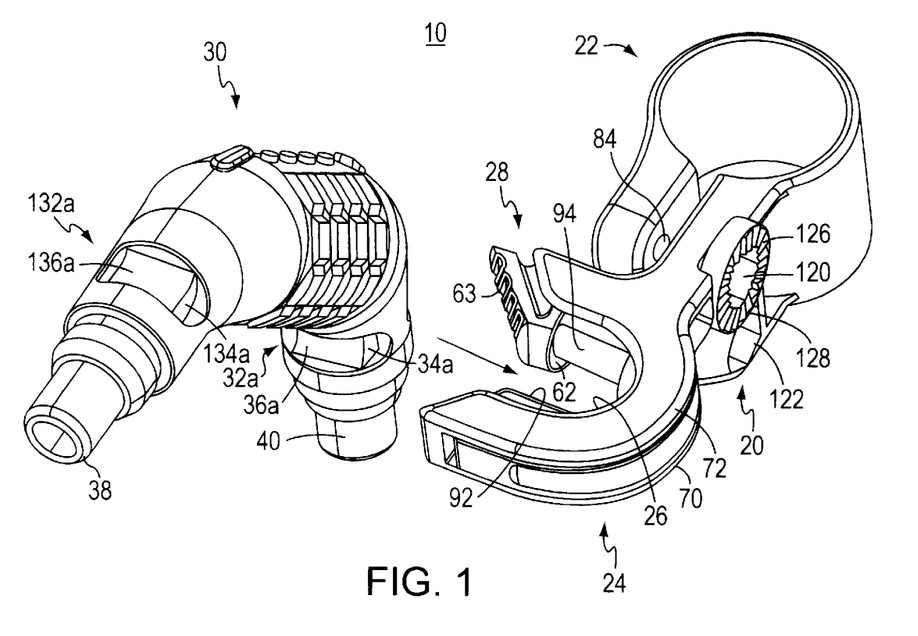
FIG. 1 is an isometric view showing a cable lock and bracket of the bracket system.

With reference to the Figures, wherein like numerals reference like or corresponding parts throughout the several views, FIG. 1 shows a representative bicycle retention system incorporating the invention and indicated generally at 10. The system 10 includes a bracket generally shown at 20 and a lock mechanism generally shown at 30. Lock mechanism 30 represents the operative element of a cable-type lock. The cable, not shown, is affixed to lock mechanism 30 at connection points shown at 38 and 40.

The bracket 20 includes an open loop end 22 for attaching bracket 20 to a bicycle and a clasping end 24 for releasably clasping a bicycle lock or other accessory. Clasping end 24 has a U-shaped seat 26, which is surrounded by a flexible hinge clamping mechanism 28, which itself terminates in an L-shaped arm 62 having a contact surface 63. Lock mechanism 30 has at least one semi-circular trough 32a for guiding and releasably securing lock mechanism 30 in U-shaped seat 26.

Open loop end 22 is equipped with a pair of fastener through-holes 82 and 84 in a first end 88 (see FIGS. 2 and 5) and another pair of fastener through-holes 120 and 122 in a second end 90 for securing bracket 20 to a bicycle. Bracket 20 is preferably fabricated from a flexible material, such as plastic, which allows open loop end 22 to be temporarily deformed into an open position by separating first end 88 and second end 90 from one another. With open loop end 22 forced open, bracket 20 may be sandwiched over the frame or other tubular portion of a bicycle. To hold bracket 20 in place on the bicycle frame a first nut and bolt mechanism (not shown) is inserted through fastener holes and 84 and 120 and a second nut and bolt mechanism (not shown) is inserted through fastener holes 82 and 122. The first nut and bolt system preferably employs a feathered nut and the second nut and bolt system preferably employs a hexagonal nut. Bracket 20 is preferably equipped with a feather nut recess 126 for receiving said first nut and bolt mechanism and a hexagonal nut recess 128 for receiving said second nut and bolt mechanism. The recesses help prevent the above-mentioned fasteners from unfastening once they are secured in position.

Figures 2, 4, 5:
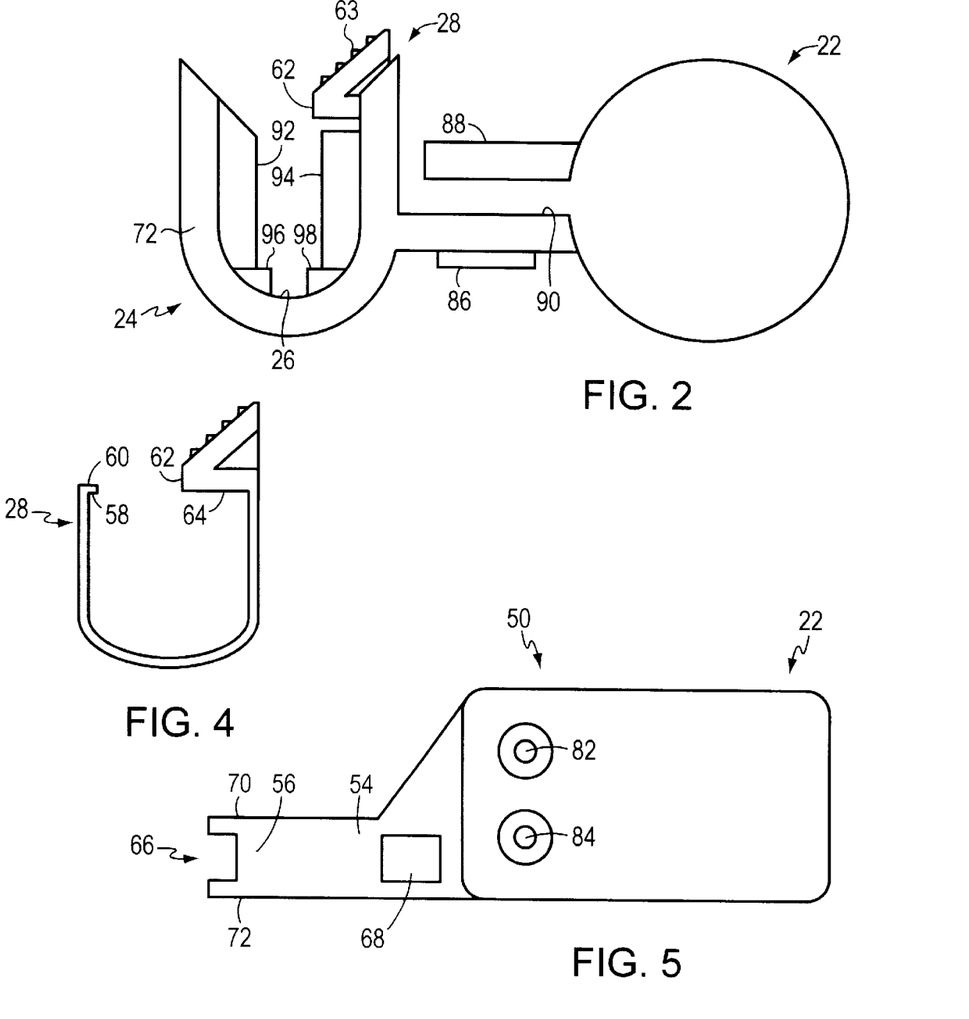
FIG. 2 is a plan view of the bracket illustrated in FIG. 1.
FIG. 4 is a plan view of the bracket illustrated in FIG. 2 without the flexible hinge illustrated in FIG. 3.
FIG. 5 is a side elevation of the bracket illustrated in FIG. 2 without the flexible hinge.
Figure 3:
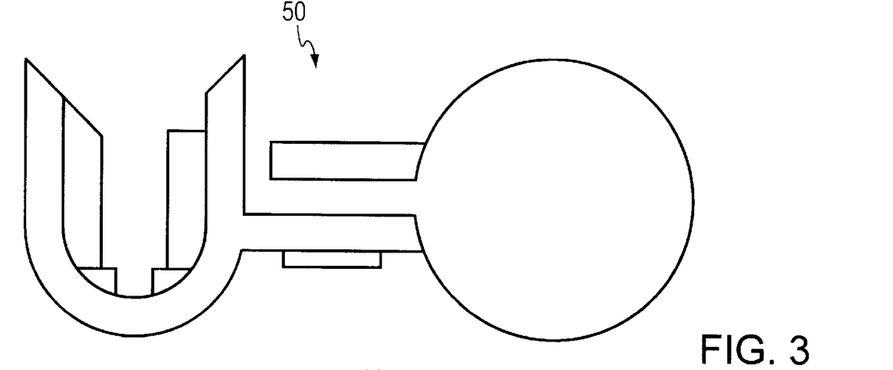
FIG. 3 is a plan view of the flexible hinge portion of the bracket illustrated in FIG. 2.

As shown in FIG. 2, the bracket 20 of system 10 is formed as a two-piece bracket system. The first piece of the system 10 is a mounting bracket component 50, which is generally shown in FIG. 3. The second piece of the system 10 is flexible hinge clamping mechanism 28, which is best shown in FIG. 4. flexible hinge clamping mechanism 28 is U-shaped and acts as the primary means of retaining lock mechanism 30 within U-shaped seat 26.

Figure 6:
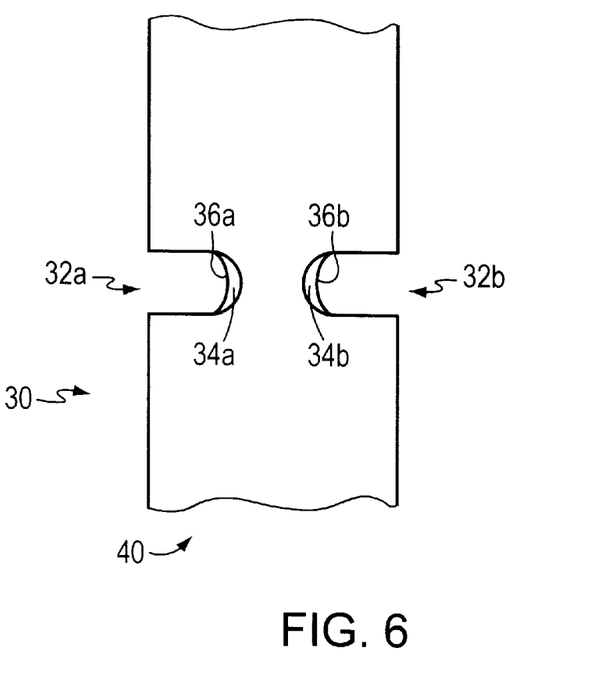
FIG. 6 is an enlarged side view of the trough portion of the lock mechanism illustrated in FIG. 1.

Clasping end 24 has a pair of guiding abutments 92 and 94, which help guide lock mechanism 30 into U-shaped seat by aligning with a pair of semi-circular troughs 32a and 32b in lock mechanism 30 (see FIG. 6). In addition to guiding lock mechanism 30 into U-shaped seat 26, guiding abutments 92 and 94 prevent lock mechanism 30 from rotating when seated. Abutments 92, 94 each have a shelf protrusions 96, 98, which mate with a pair of detent ridges 34a, 34b of lock mechanism 30. This further secures lock mechanism 30 within U-shaped seat 26. A first flange 70 (not shown) and a second flange 72 form a semi-circular saddle 66 that parallels U-shaped seat 26.

FIG. 5 shows a side elevation view of mounting bracket component 50 without flexible hinge clamping mechanism 28. flexible hinge clamping mechanism 28 may be connected to mounting bracket component 50 by threading first end 60 through an opening 68 in mounting bracket component 50. flexible hinge clamping mechanism 28 is slidably threaded through opening 68 and along semi-circular saddle 66 until an abutment portion 64 of L-shaped arm 62 contacts the exterior surface of mounting bracket component 50 where indicated at 54. A retaining tab 58 of flexible hinge clamping mechanism 28 engages the exterior surface of mounting bracket component 50 where indicated at 56, thereby preventing flexible hinge clamping mechanism 28 from sliding off semi-circular saddle 66 (see FIG. 1). To ensure a tight alignment, the flexible hinge clamping mechanism 28 has an internal radius approximately equal to that of semi-circular saddle 66. In order to releasably retain lock mechanism 30 in bracket 20, L-shaped arm 62 of flexible hinge 28 is ramped away from U-shaped seat 26, thereby allowing lock mechanism 30 to slide into U-shaped seat 26.

Figure 7:
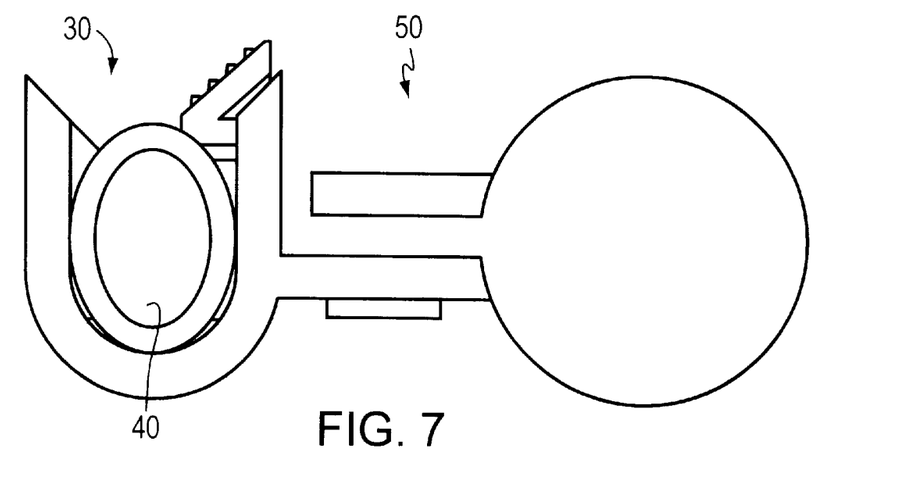
FIG. 7 is a plan view of the cable lock and bracket of FIG. 1, showing the cable lock mechanism inserted into the bracket.
Figure 8:
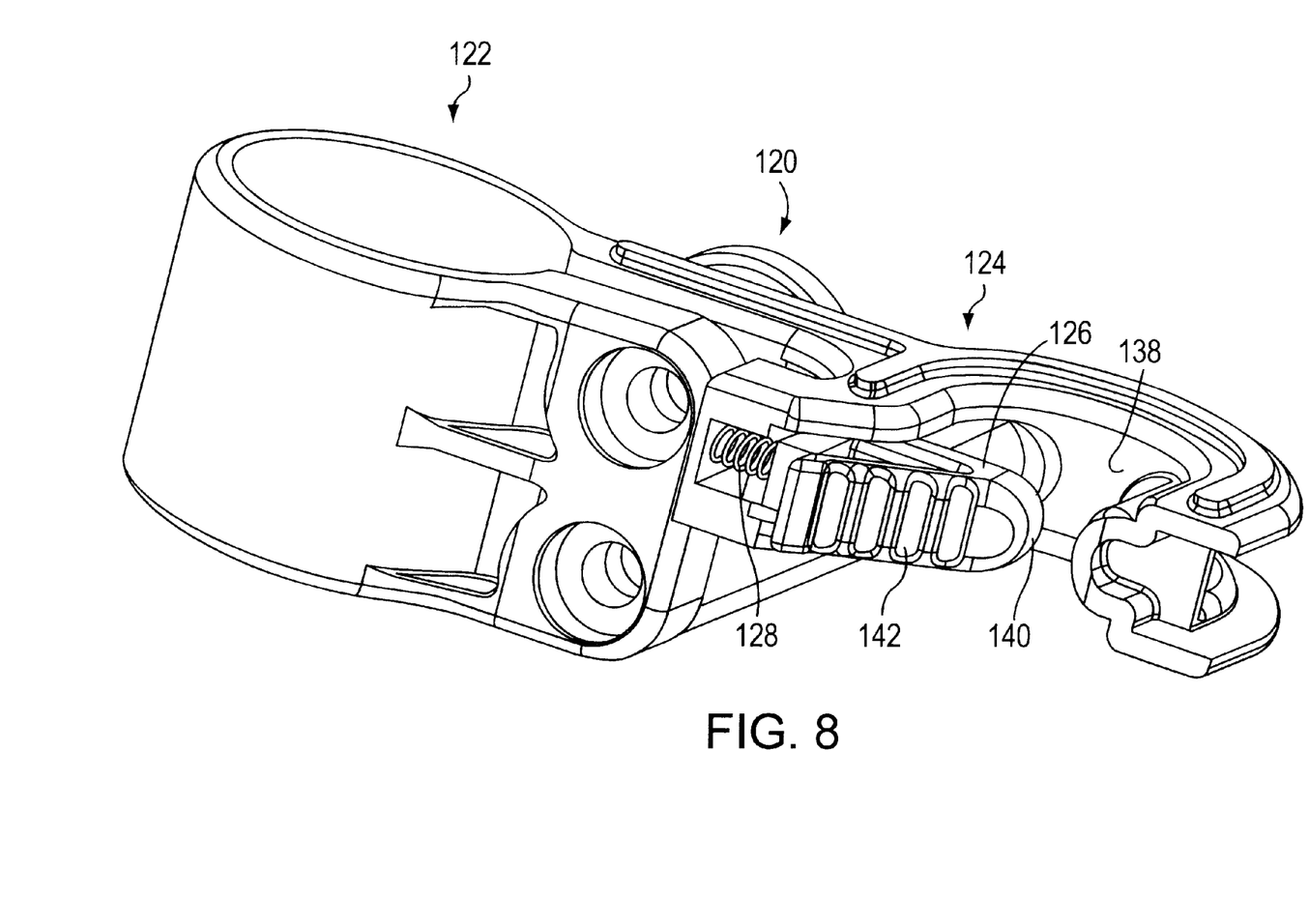
FIG. 8 is a perspective view of the bracket.

With renewed reference to FIG. 1, the bicycle lock bracket system 10 is assembled by sliding lock mechanism 30 against U-shaped seat 26 of bracket 20. As noted above, abutments 92, 94, disposed along the inner radius of the U-shaped seat 26, act to guide semi-circular troughs 32a, 32b into bracket 20. Passage of lock mechanism 30 into U-shaped seat 26 deflects L-shaped arm 62 outward. After lock mechanism 30 is fully seated within U-shaped seat 26, the L-shaped arm 62 snaps into place, the abutment portion 64 of L-shaped arm 62 engaging the detent ridge 34b to releasably secure the lock mechanism 30. The lock mechanism 30 may be released from the bracket 20 by pressing against the contact surface 63 of L-shaped arm 62, thereby disengaging it from the detent ridge 34b. FIG. 7 shows the bicycle lock bracket system 10 components, lock mechanism 30 and bracket 20, assembled together.

The lock mechanism 30 of FIG. 1 is shown having an additional, optional set of semi-circular troughs 132a, 132b, detent ridges 134a, 134b, and semi-circular abutments 136a, 136b that may also be used to secure lock mechanism 30 in lock bracket 20.

Figure 9:
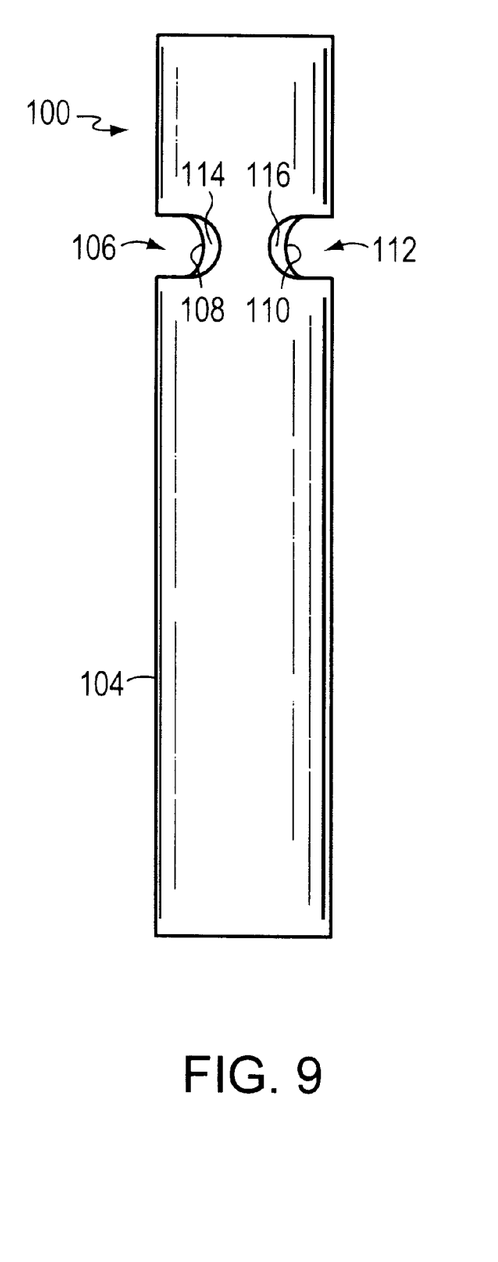
FIG. 9 is an elevation of a U-shaped lock showing the locking cylinder portion.
Figure 10:
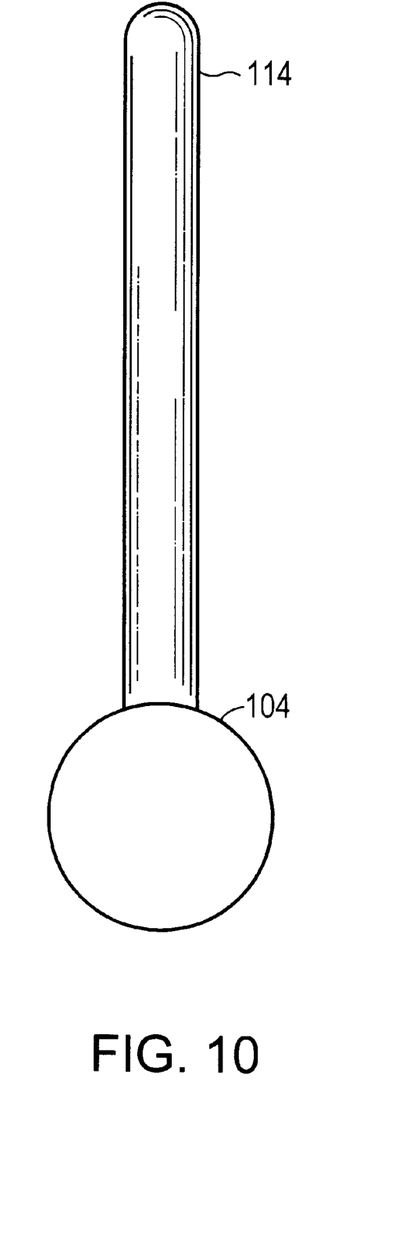
FIG. 10 is a plan view of the U-shaped lock of FIG. 8 showing the U-shaped portion inserted into the locking cylinder.
Figure 12:
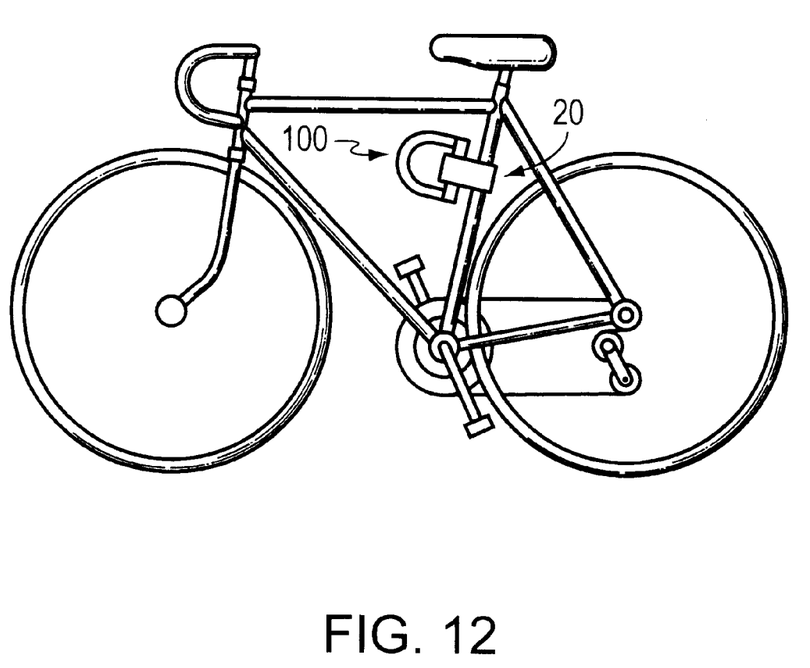
FIG. 12 is an elevation of a bicycle equipped with the bracket of FIG. 1 and a U-shaped lock as illustrated in FIG. 8.

As explained previously, the illustrated locking mechanism 30 is part of a cable-type lock. FIGS. 9, 10 and 12, however, illustrate that the invention is also suited to use in connection with U-shaped locks. With reference to FIG. 9, a locking cylinder 104 of a U-shaped lock is generally represented at 100. A pair of semi-circular troughs 106 and 112 is formed within the sides of locking cylinder 104. Within each semi-circular trough 106, 112 is an abutment 108, 110, respectively, which form a pair of tabs 114, 116. None of these components interferes with operation of locking cylinder 104, which, as shown in FIG. 10, receives a U-shaped security member 114 in the conventional manner.

Troughs 106, 112 slide against abutments 92, 94 of U-shaped seat 26 (see FIG. 2) as locking cylinder 104 is received within the seat. L-shaped arm 62 engages one of tabs 114, 116 in locking cylinder 104 to releasably secure it within U-shaped seat 26. Of course the semi-circular troughs 106 and 112, depicted in FIG. 9 in the sides of locking cylinder 104 could also be formed in the U-shape portion of the U-shaped lock.

Figure 11:
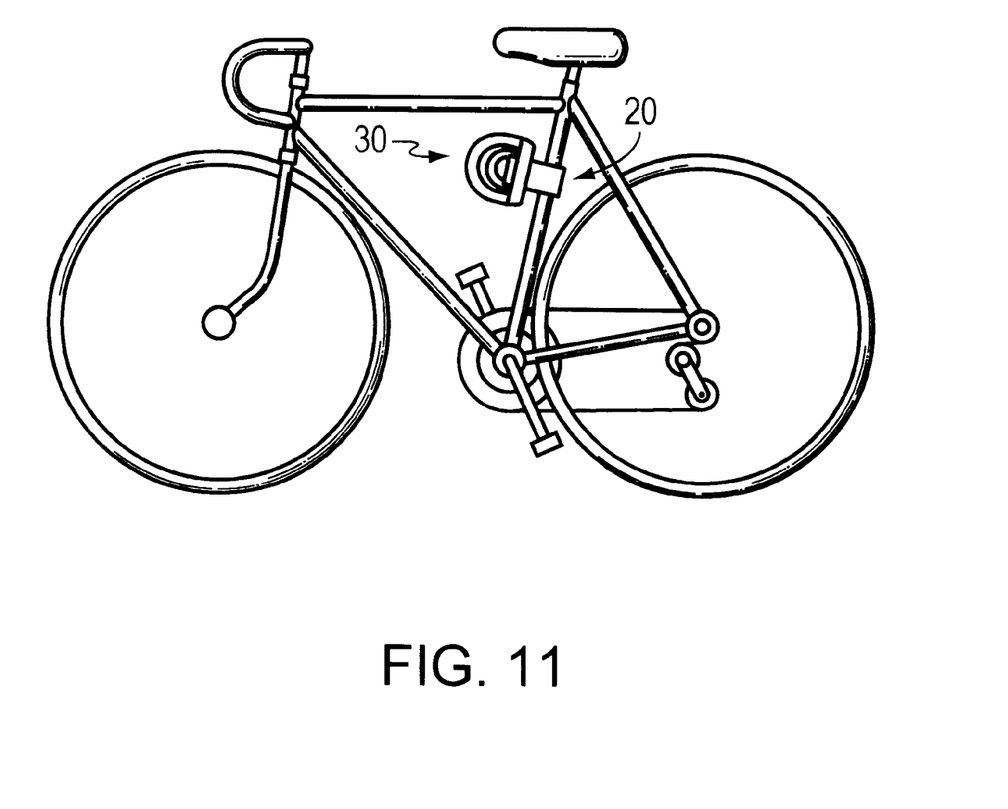
FIG. 11 is an elevation of a bicycle equipped with the bracket and cable lock of FIG. 1.

FIGS. 11 and 12 depict the lock and bracket systems, as described above, attached to the frame of a bicycle. The various embodiments of the above-disclosed systems could also be attached to the seat post, handlebars or other framing member.

Various means for securing different types of lock mechanisms have been discussed thus far, however, the bracket system could also be used for securing other accessories to a bicycle. For example, a water bottle or accessory case having a trough system as described above could also be releasably secured to a bicycle using the combination U-shaped seat and flexible hinge bracket of the present invention.

It will thus be seen that the objects set forth above, among those made apparent from the preceding description, are efficiently attained. Also, since certain changes may be made in the construction set forth without departing from the scope of the invention, it is intended that all matter contained in the above-description or shown in the accompanying drawings shall be interpreted as illustrative and not in a limiting sense.

It is also to be understood that the following claims are intended to cover all of the generic and specific features of the invention described herein.

What is claimed is:

1. A bicycle retention bracket system comprising:

a bracket adapted for secure affixation to a bicycle;

an article to be retained; and coacting first and second connection means on the bracket and the article, respectively, for releasably coupling the article to the bracket so that, when coupled, the article cannot move relative to the bracket wherein the first connection means includes a flexible hinge formed of rigid plastic and comprising a clasp having a contact surface, the clasp engaging the article when the article is coupled to the bracket, pressure on the contact surface disengaging the clasp to facilitate removal of the article from the bracket.

2. The bracket defined in claim 1 wherein the second connection means includes at least one channel disposed on an outer periphery of the article for receiving the first connection means.

3. The bracket system in claim 1 wherein the article is a lock element.

4. The bracket system defined in claim 1 wherein the article is a U-shaped lock.

5. A bicycle retention bracket system comprising:

a bracket adapted for secure affixation to a bicycle;

a cable lock to be retained; and coacting first and second connection means on the bracket and the cable lock, respectively, for releasably coupling the cable lock to the bracket so that, when coupled, the cable lock cannot move relative to the bracket wherein the first connection means includes a flexible hinge comprising a clasp having a contact surface, the clasp engaging the cable lock when the cable lock is coupled to the bracket, pressure on the contact surface disengaging the clasp to facilitate removal of the cable lock from the bracket.

6. A bicycle retaining bracket comprising means for clamping to a bicycle and a flexible hinge clasping mechanism formed of rigid plastic for releasably coupling an article to the bracket wherein the flexible hinge includes a clasp having a contact surface, the clasp engaging the article when the article is coupled to the bracket, pressure on the contact surface disengaging the clasp to facilitate removal of the article from the bracket.

7. An article adapted for retention on a bicycle, the article comprising:

a solid portion having at least one tubular trough disposed on an outer periphery of said solid portion;

an abutment disposed within the at least one tubular trough; and a retaining tab formed by the abutment for releasably receiving a bracket wherein (i) the at least one tubular trough and abutment are adapted to engage a flexible hinge clasp and (ii) the article is a cable lock or a U-shaped lock.

8. A bicycle retention bracket system comprising:

a bracket having a first end adaptable for secure affixation to a tubular section of a bicycle and a second end having a U-shaped seat;

an article to be retained; and coacting first and second connection means on the bracket and the article, respectively, for releasably coupling the article to the bracket so that the article cannot move relative to the bracket wherein the first connection means includes a flexible hinge formed of rigid plastic and comprising a clasp having a contact surface, the clasp engaging the article when the article is coupled to the bracket, pressure on the contact surface disengaging the clasp to facilitate removal of the article from the bracket.

9. The bracket system defined in claim 8 wherein the first connection means includes a flexible hinge.

10. A retention bracket system for releasably securing an article to a bracket, the system comprising:

an article having at least one semi-circular trough disposed about an outer periphery and a semi-circular abutment disposed within the semi-circular trough, the abutment having a detent ridge;

a bracket clement having a U-shaped seat for operatively receiving the semicircular trough of the article, the U-shaped seat having an inner radius and an outer radius;

a flexible hinge disposed about the outer radius of the U-shaped seat for releasably securing the article to the bracket element; and a guiding abutment disposed along the inner radius of the U-shaped seat for preventing rotation of the article within the U-shaped seat.

11. The system defined in claim 10 wherein the article is a cable lock.

12. The system defined in claim 10 wherein the article is a U-shaped lock.

13. The system defined in claim 10 wherein the article is a bicycle accessory.

14. The system defined in claim 10 wherein the flexible hinge is formed of rigid plastic.

* * * * *